Figure 2:
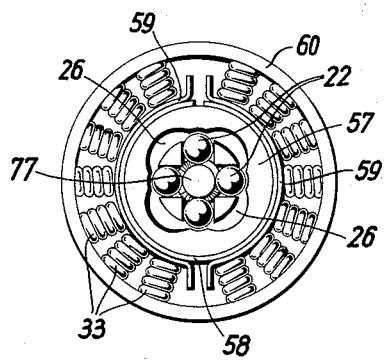

July 5, 1966 N. RIEDEL ET AL 3,259,215
ELECTROMAGNETICALLY OPERATED BRAKING DEVICES
Filed June 22, 1962 4 Sheets-Sheet 1
FIG. 1
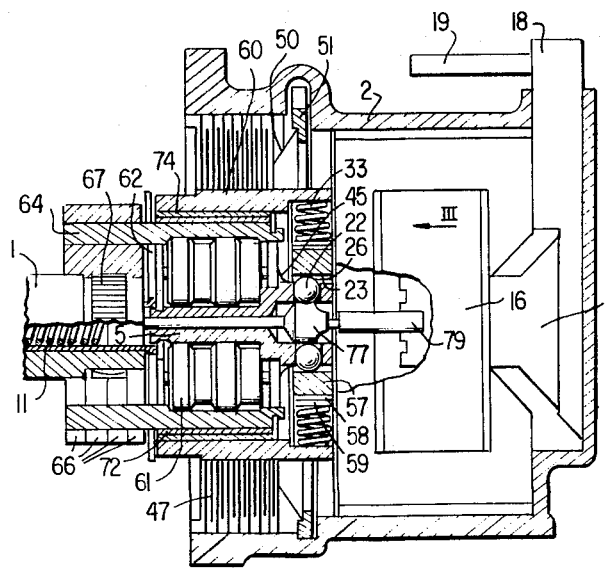
FIG. 4
FIG. 5
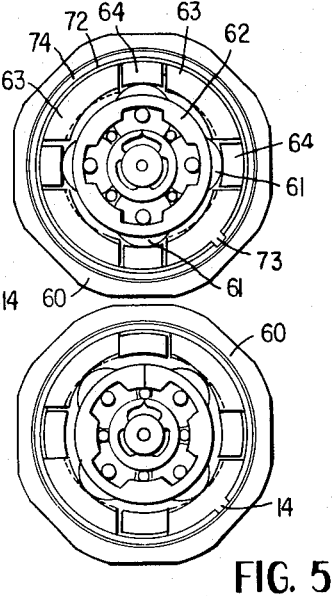
FIG. 6
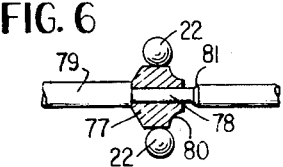
FIG. 7
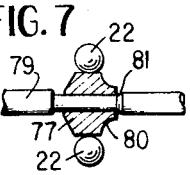
FIG. 8
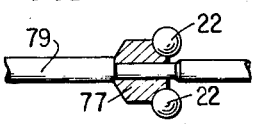
FIG. 9
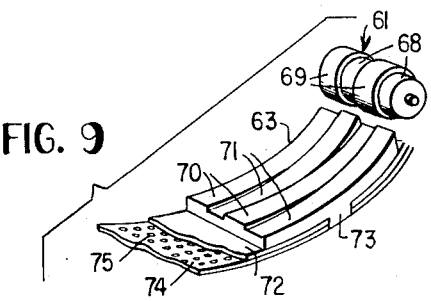
FIG. 10
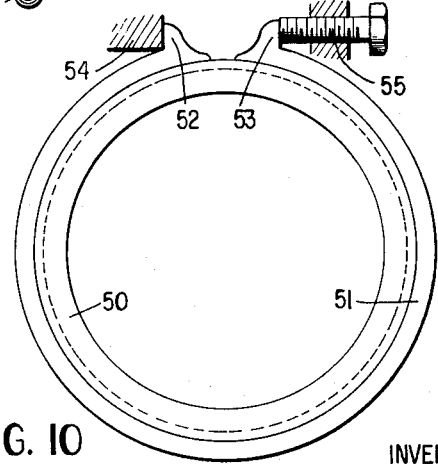
INVENTORS.
NORBERT RIEDEL
RUDOLF SCHUBERT
BY *Paul M. Craig, Jr.*
ATTORNEY.

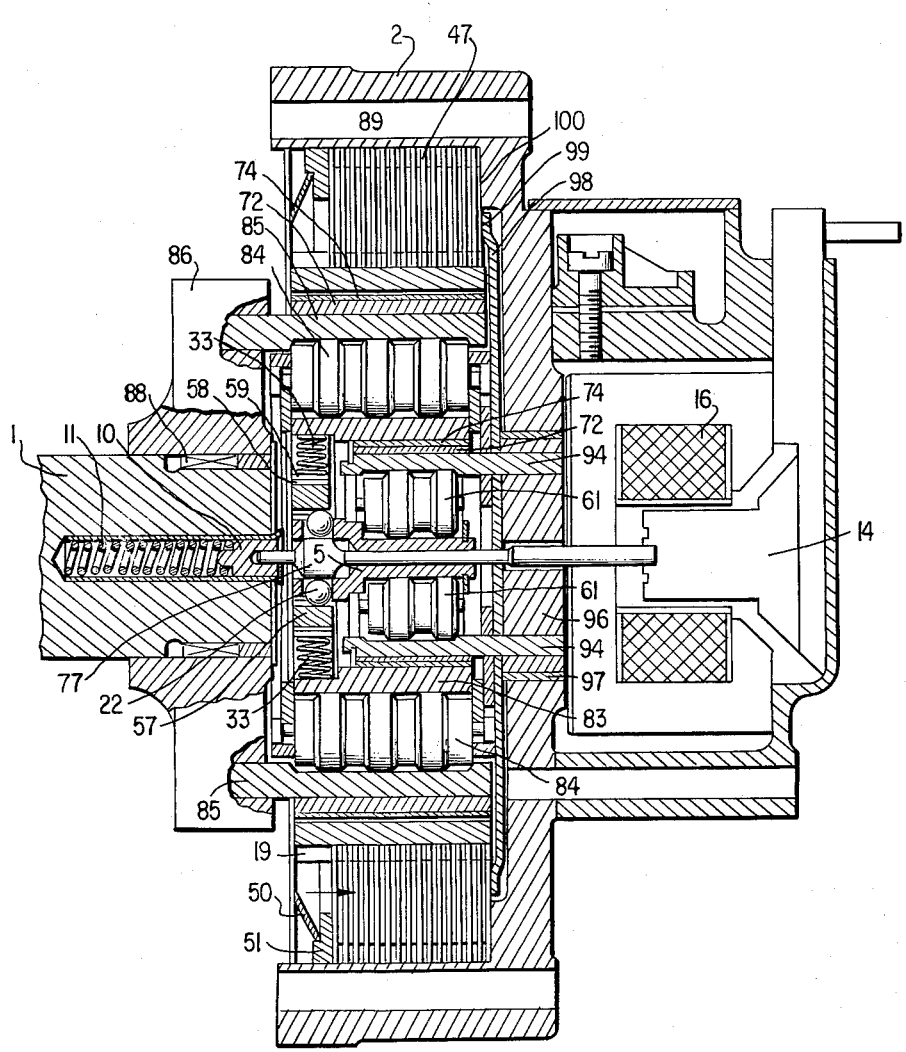
FIG. II

INVENTORS.
NORBERT RIEDEL
RUDOLF SCHUBERT

BY
ATTORNEY.

United States Patent Office 3,259,215
Patented July 5, 1966

3,259,215
ELECTROMAGNETICALLY OPERATED
BRAKING DEVICES
Nobert Riedel, Hochbucherweg 45, Lindau (Bodensee), Germany, and Rudolf Schubert, Lindau (Bodensee), Germany; said Schubert assignor to said Riedel
Filed June 22, 1962, Ser. No. 204,521
Claims priority, application Germany, June 23, 1961, R 30,598; Oct. 14, 1961, R 31,290
15 Claims. (Cl. 188—161)

The invention relates to an electromagnetically operated braking device.

The object of the invention is to produce a device which operates in a satisfactory manner as a brake and which is reliable in operation besides being of particularly simple construction and consequently capable of being produced economically.

This object is attained according to the invention in that preceding the braking device producing the braking force a servo arrangement is provided which is in operative connection with the electromagnet on the one hand and with the braking device on the other hand.

As a result, for operating the brake only relatively small initial forces are necessary which under servo action are converted into the requisite braking or coupling force within the device. The use of the servo arrangement also ensures a high degree of adaptability to the different requirements in practice, so that even very high braking forces can be produced.

The pull key is preferably self braking, a fact which simplifies the control considerably. Whereas the spring force influences the servo arrangement in the sense of the engagement of the locking members in pockets of the surrounding annular element, the electromagnet, through its force acting in the opposite direction on the pull key, effects the disengagement of the brake or coupling.

Yet another feature of the invention consists in that the pull key is mounted on an axially shiftable rod guided in the rotary key, on one end of which rod the magnet armature is fixed while a pressure spring acts on its other end.

Another possible practical embodiment of the fundamental idea of the invention consists in that the clamping members consist of rollers which are surrounded by a ring composed of brake shoes or cheeks arranged opposite braking surfaces and in the gap between which catches connected with the shaft engage.

According to another feature of the invention, a particularly advantageous braking effect is attained by the brake shoes or cheeks having bearing surfaces for the clamping rollers ascending in longitudinal direction from the middle towards both sides. In this connection it has been found particularly advantageous when the clamping rollers have, as also provided for by the invention, a reduced periphery and the brake shoes run-on surfaces for the clamping rollers which cooperate with the corresponding surfaces of the rollers according to the direction of rotation. The brake or clamping jaws are then always pressed radially outwards.

In order to increase the clamping effect of the clamping cheeks still further, these are, according to another feature of the invention, surrounded by a split clamping ring one end of which engages alternately in the outer projection of one of the clamping cheeks according to the direction of rotation. This ring is radially stimulated by the bearing of the clamping cheeks, thereby producing an increased servo effect.

Figure 3:
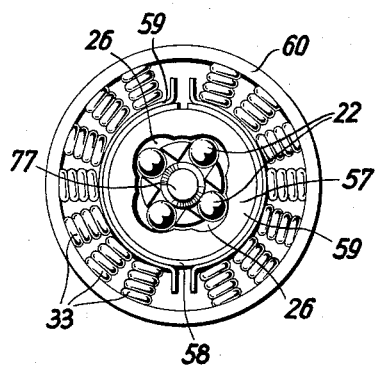
Figure 12:
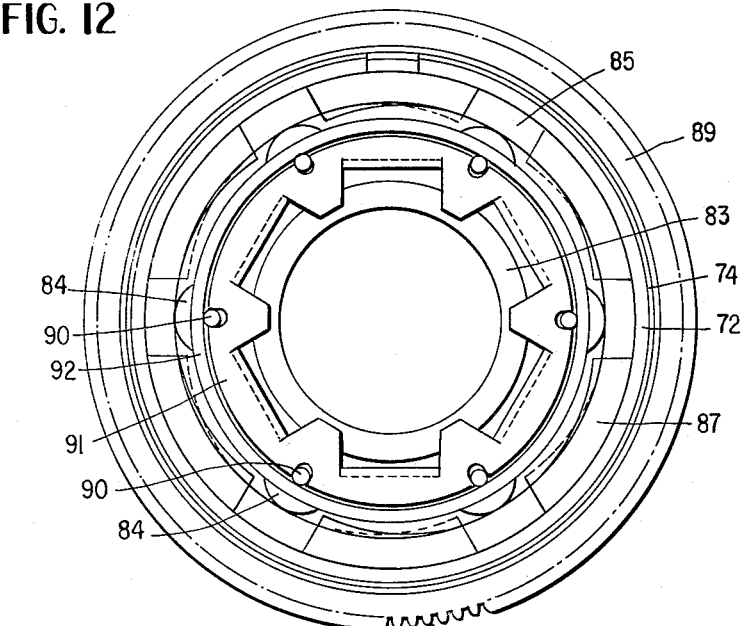
Figure 13:
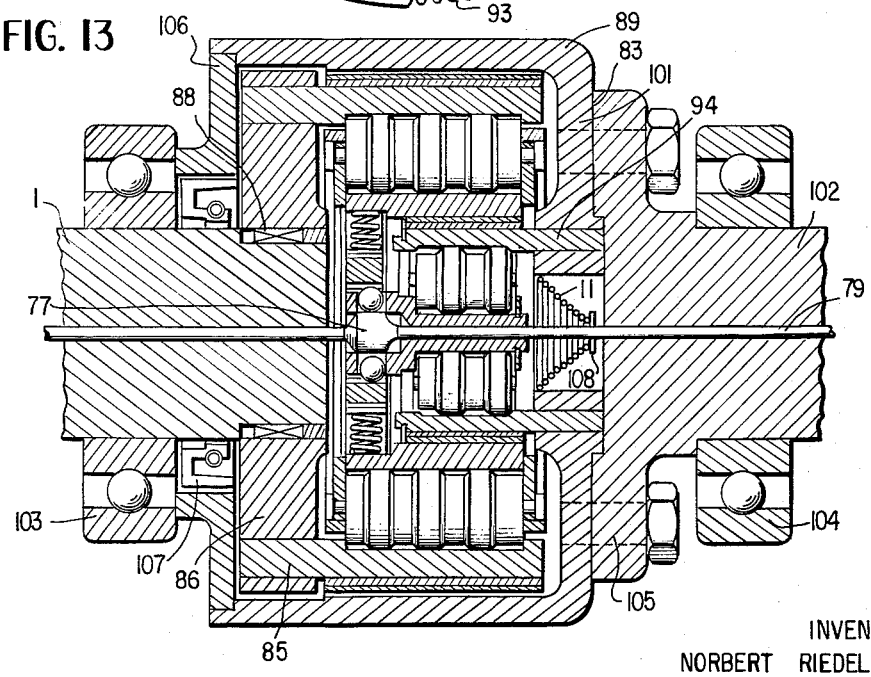

Further features, details and advantages of the invention will become apparent from the description of a few embodiments of the invention illustrated by way of example in the accompanying drawings, in which FIG. 1 is an axial section through the first embodiment;
FIG. 2 shows the servo arrangement viewed in the direction of the arrow, III, in braking position;
FIG. 3 is a similar view to FIG. 2 but with the servo arrangement in released position;
FIGURE 4 is an elevation of the braking device viewed in the direction of the arrow III;
FIGURE 5 is a view similar to FIGURE 4 but showing the braking device in operative or clamping position;
FIGURES 6, 7 and 8 show the pull key arrangement in different positions;
FIGURE 9 is a perspective view of one of the clamp cheeks with its clamping companion element;
FIGURE 10 is an elevation of the clamping arrangement acting on the coupling or clutch discs;
FIGURE 11 shows another embodiment of the invention in axial section;
FIGURE 12 is an end view of a secondary braking arrangement; and
FIGURE 13 shows another form of the invention construction as a coupling.

FIG. 1 shows the first embodiment of the invention in the form of a brake which serves for braking the shaft 1 which may be found in any working machine, for example, a machine tool or the like and which is to be braked quickly and started up again quickly in more or less short intervals of time. The free end of this shaft 1 engages in the housing 2 of the braking device and rotating with this shaft is a rotary key 5 having a central bore widened at one end. The other end of the rod carries a pull key 77 or truncated conical shape. A push rod 79 connected with the magnet armature 14 acts on the end face of the pull key. The coil of the magnet is designated by 16. The magnet armature 14 is movable to and fro and also provided with a lifting lever 18 which is mounted in the housing 2 and serves for releasing the brake when the current is cut off. The crank 19 serves as operating means.

The brake housing 2 accommodates not only the arrangement producing the braking force, shown particularly in FIGS. 4 and 5, but also the locking arrangement, shown particularly in FIGS. 2 and 3.

This locking arrangement consists substantially of locking balls 22 which bear radially against the pull key 77 which comprises a tapering portion 78 bounded by a shoulder 81 and exceeding in length the pull key. Thus the pull key can move axially on the portion 78. The pull key has pockets 80 for receiving locking balls 22. The locking balls 22 are located in radial grooves 23 cut in the rotary key 5. The locking members or balls 22 are surrounded by a ring 57. The inner periphery of this ring 57 is provided with engagement pockets 26 corresponding in number to the number of locking members. 22. A plate spring 45 prevents an outward centrifugal movement of members 22.

A clamping ring 50 bears against one end of the disc pack and has two noses 52, 53 one of which is rigidly supported at 54 while the other is acted upon by a stationary set screw 55. By tightening this screw 55 the diameter of the clamping ring 51 and consequently the angle of conicity of the plate spring 50 are changed, causing an alteration of the axial pressure acting on the discs 47.

The braking ring 57 previously referred to is concentrically encircled by rings 58, 59 shiftable in relation to each other, one of these rings consisting, for example, of a bronze band which may also be perforated. The springs 33 which bear against the outer side of these rings 58, 59 are supported at their other end by a brake sleeve 60 which carries half the discs 47, for which purpose this sleeve 60 is of octagonal shape, as shown in FIGS. 8 and 9.

The braking arrangement as it is shown in FIGURES 1 to 9 inclusive is provided with rollers 61 as clamping bodies, which are mounted in a cage designated by 62 and thus bear against the outer wall of the rotary key 5. The clamping rollers 61 are surrounded on the outer side by clamping shoes or cheeks 63 which are of sector shape and located between the catches designated by 64 which are axially pressed in the discs 66 keyed on the shaft 1. The two outer discs 66 serve primarily for centering the catches 64 while the two inner discs have a notched tooth portion facing the shaft 1 and engaging toothed portion 67.

The clamping rollers 61 have a reduced periphery with pairs of faces 68 and 69. Similarly the inner surfaces of the brake cheeks 63 which are in engagement with the clamping rollers 61 are provided on both sides with ascending but mutually displaced run-on surfaces which, in the example illustrated, form pairs of surfaces 70 and 71. Concentric with the braking cheeks 63 and the catches 64 a split clamping ring 72 is provided the ends of which bear against a projection 73 of a brake shoe. The clamping ring 72 is in turn concentrically arranged with a likewise split bronze ring 74 which is provided with perforations designated by 75.

The method of operation of the species shown by FIGURE 1 is as follows:

The shaft 1 is rotated by an engine which is not illustrated. Rotating together with this shaft 1 are the axially directed coupling arms 64. Also rotating are the brake shoes 63 which are loosely inserted between the coupling arms 64. The coupling arms 64 and the brake shoes 63 are embraced by the clamping ring 72 and the bronze ring 74, with the two last-mentioned components rotating also.

Also rotating with the shaft 1 is the rotary key 5, with the locking balls 22 being mounted within its radial grooves 23. The spring 45 prevents the balls 22 from engaging the locking ring 57 through centrifugal forces (idling).

In this idling position the rollers 61 are disposed as shown by FIGURE 4, that is disengaged from the brake or friction blocks 63. These rollers 61 which are held by the cage 62 in contact with rotary key 5, rotate therefore together with the shaft 1 also.

Now, when the pull key 77, mounted concentrically within the rotary key 5, moves to the right under the influence of spring 11 with the electro-magnet 16 being de-energized, the locking balls 22 will overcome the force of spring 45 and will move radially outward, thereby engaging the stationary locking ring 57. The balls 22 will enter the pockets 26 of the locking ring 57, thereby retarding the rotation of the key 5. The entrance of the balls 22 into the pockets 26 of the locking ring 57 generates a shock which is absorbed by the relatively movable rings 58 and 59 and especially by the springs 33 disposed between these rings and brake sleeve 60.

Since the rotation of the rotary key 5 is retarded by the entrance of the balls 22 into the pockets 26 of the locking ring 57, a relative rolling movement of the rollers 61 with respect to the key 5 will result. The rollers 61 will turn about their own axis and will move from the position shown by FIGURE 4 into the position as shown by FIGURE 5 and the rollers 61 will run depending on their direction of rotation, either onto the key faces 70 or the key faces 71 of the brake shoes 63. The latter are forced thereby radially outward against the surrounding rings 72 and 74. The bronze outer friction ring 74 will now engage the brake sleeve 60 which up to now was stationary, in other words, a frictional coupling takes place between the slotted bronze ring 74 and the inside perimeter of the brake sleeve 60.

FIGURES 4 and 5 show that the outer perimeter of the brake sleeve 60 is designed in the shape of a multiple-cornered piece (for example octagonally). Onto this multi-cornered outer perimeter there is slid the inner multiple-disk assembly 47. These inner multiple disks are coupled continuously by friction, under the influence of the cup spring 50, with the other multiple-disk assembly which is fastened to the outer housing 2.

Now, if through the engagement by the brake blocks 63 by way of the slotted rings 72 and 74 the brake sleeve 60 is set in rotation, this moment of rotation will be cancelled instantly by the multiple disks 47 which are continuously engaged by friction, thereby stopping the shaft 1.

In case of the FIGURE 1 arrangement, the braking of shaft 1 requires a relatively small force of the spring 11 (when overcome by the magnet 16). This small force generates in turn through the rotating key 5, the rollers 61 and the friction blocks 63 a very great braking force with respect to the stationary part. The term servo-effect is used to denote this occurrence.

To release the brake, the pull key 77 must first be disengaged from the locking members 22. As under the action of the spring 11 the rod 79 is located in the position shown in FIGS. 1 and 6, the rod, when the magnet coil 16 is energized, first moves idly a certain distance until the shoulder 81 of the reduced portion 78 contacts the key 77. The kinetic energy inherent in the rod through the idle movement is sufficient to shift the pull key 77 out of rigid engagement with the locking members 22 so that the lock is removed. FIG. 7 illustrates the moment when the shoulder 81 strikes against the pull key 77, while FIG. 8 shows the end status in which the locking members 22 are in engagement with the pockets 80 of the pull key 77. Accordingly the locking of the rotary key 5 is released, so that the clamping rollers 61 can move out of their run-on position in relation to the clamping cheeks 63 into the neutral or rest position.

With further reference to the operation of the species of FIGURE 7, it is pointed out that the above-referred-to-rotary movement of the key 5 is transmitted by friction to the clamping rollers 61 and these rollers run up the pairs of surfaces 70, 71 of the clamping shoes 63. This produces a wedging effect due to the wedge shape of the clamping jaw surfaces 70, 71 and this wedging pressure is transmitted to the slotted rings 72 and 74. The outer ring 74 will therefore be brought into frictional engagement with the brake sleeve 60 which carries a portion of the friction discs 47.

The form of construction illustrated in FIG. 11 shows the system producing duplication of the braking force, the primary and secondary braking arrangements being arranged concentrically one within the other.

Deviating from the construction shown in FIG. 1, in the device according to FIG. 11 the rotary key 5 is in the radial grooves 23 of which the locking members 22 are guided, first remains still when the brake is released, while the locking ring 57 rotates with the two rings 58, 59 concentrically surrounding it, as well as with the spring system 33. Thereby the spring system entrains the sleeve 83. This corresponds substantially to the function of the sleeve 60 in the form of construction illustrated in FIG. 1. However, the sleeve 83 acts at the same time as rotary key for the clamping elements 84 of the secondary braking arrangement. These clamping elements 84 are in turn located within a circle of brake cheeks which are arranged between the catches 85 which in turn are fixed on a ring 86 rigidly connected to the shaft 1. In this form of construction a notched toothed portion 88 again serves as connecting means.

According to the species of FIGURE 11, the rotary key 5 in the radial recesses of which the locking or blocking elements 22 are guided, is initially at a standstill with the brake being in the de-energized position. On the other hand, the blocking ring 57 rotates with the two rings 58, 59 surrounding it concentrically and with the spring arrangement 33. The springs 33 are taken along thereby by the clamping sleeve 83. This clamping sleeve 83 corresponds in the function thereof to the sleeve 60 in the embodiment according to FIGURE 7. Nevertheless, the sleeve 83 acts simultaneously as turnstile for the clamping elements 84 of the secondary brake arrangement. These clamping rollers 84, in turn, are positioned within a circular grouping of clamping jaws which are arranged between the cam followers 85, and these cam followers 85 are, in turn, secured to a ring 86 which is rigidly connected with the shaft 1. A serration 88 serves again for this purpose.

Between the clamping cheeks 87 (FIG. 12) and the braking sleeve 89, the rings 72 and 74, known from FIGS. 1 to 9, are again interposed. The sleeve 89 carries the inner discs of the disc pack 47. The axles of the clamping rollers 84 of the secondary braking arrangement are guided in a cage 91, as shown particularly in FIG. 12, and they are surrounded by a guide or holder ring 92 which ensures a reliable contact between the clamping rollers 84 and the clamping sleeve 83. The toothing provided on the outer periphery of the sleeve 89, serving for fixing the inner discs of the disc pack 47, is designated by 93 in FIG. 12.

The catches 94 of the primary braking arrangement are, according to FIG. 11, fixed in a guide disc 96 which rests in a bearing 97 in the housing 2. These catches 94, the intermediate brake cheeks of which again cooperate with the rings 72 and 74 concentrically surrounding them, pass through the disc 98, the outer end of which engages the innermost disc 100 of the pack 47. When braking, the catches rotate with the disc to the extent of the slip between the coupling discs 47.

FIG. 13 shows the application of the fundamental idea of duplicating the braking arrangement according to FIG. 11 in combination with a clutch or coupling in which a slip clutch provided with disc pack 47 is superfluous because for the coupling engagement the slip between the clamping cheeks and the sleeves 83 and 89 surrounding them is sufficient. In accordance therewith the catches 85 are also connected through the intermediary of the disc 84 with the shaft 1 and the other catches 94 are directly connected by the flange 101 of the sleeve 89 to the shaft 102. The bearings carrying the two shafts 1 and 102 are indicated at 103 and 104. The flange 101 is rigidly connected with the shaft 102 by a screw-connection 105. The coupling shown in FIG. 13 is enclosed by means of a cover plate 106 and provided with a packing 107.

The rod 79 guiding the pull key 77 can, as shown, be extended outwards both by the shaft 1 as well as by the shaft 102. The spring 11 in this case bears against a pin 108 provided on the rod 79 and forming a stop.

It is evident that the invention is not restricted to the embodiments described and illustrated in the drawings and that numerous modifications are possible without departing from the fundamental idea of the invention.

What is claimed is:

1. A braking device for a rotatable member comprising braking means adapted to be operatively connected to said member, means including servo means operatively connected with said braking means for control thereof, said servo means including a rotary key member having an exterior peripheral surface and clamping means including a plurality of movable clamping members operatively connected with said rotatable member, said clamping means further including rotary clamping bodies engaging said peripheral surface, means including locking means for said rotary key for moving said rotary clamping bodies into positions abutting said clamping members wherein said clamping members are pressed radially outwardly by said rotary clamping bodies into operative engagement with said braking means, and means including stationarily fixed electro magnetic means controlling said locking means.

2. A device according to claim 1, wherein each of said rotary clamping bodies comprises roller members having two sets of peripheral portions, one of said sets being of a diameter greater than the other of said sets, said movable clamping members each having oppositely arranged internal braking surfaces for coaction with said two sets of peripheral portions.

3. A device according to claim 1, wherein abutment members are connected to said rotatable member and disposed intermediate adjacent ones of said clamping members to thereby provide an operative connection between said rotary shaft and said clamping members.

4. A device according to claim 3, wherein said rotatable member is a shaft, disc-shaped means fixed on said shaft, said abutment members being fixed to said disc-shaped means.

5. A device according to claim 4, wherein said movable clamping members are provided with a plurality of arcuate surface portions for engagement by said rotary clamping bodies.

6. A device according to claim 5, wherein said rotary clamping bodies comprise peripheral portions of different diameters, said arcuate surface portions being disposed in pairs, the surface portions of one pair being of a different disposition from the surface portions of another pair.

7. A device according to claim 6, said clamping means further including a split ring surrounding said clamping members, radially extending projections on said clamping members, said split ring engaging one of said projections.

8. A device according to claim 7, said clamping means further comprising a perforated bronze ring surrounding said split ring.

9. A device according to claim 8, wherein said bronze ring is provided with perforations.

10. A device according to claim 9, wherein said braking means comprises a braking sleeve, the radially opposite surfaces of said bronze ring comprise braking surfaces, one of said surfaces being in frictional contact said braking sleeve.

11. A device according to claim 4, wherein said braking means comprises a braking sleeve, a brake housing and a plurality of sets of friction discs, the discs of one set being interleaved with the discs of another of said sets, said one set being carried by said braking sleeve and said another of said sets being carried by said brake housing.

12. A device according to claim 11, further comprising a conical plate spring exerting an axial loading pressure on said friction discs, and a clamping ring of selectively variable diameter engaging said plate spring and operative to vary the conical angle of said plate spring.

13. A device according to claim 3, wherein said rotary clamping bodies are rotatably mounted in rotatable cage means surrounding said rotary key member, said cage means including means maintaining contact between said rotary clamping bodies and said peripheral surface.

14. A device according to claim 1, wherein said braking means comprises primary and secondary braking means, said secondary braking means being disposed concentrically with and surrounding said primary braking means.

15. A device according to claim 14, wherein said primary braking means comprises a rotary braking sleeve member, said second braking means comprising clamping means including clamping roller means, said roller means being disposed on the periphery of said rotary braking sleeve member.

References Cited by the Examiner

UNITED STATES PATENTS 2,649,941   8/1953   Doebeli _____ 188—138 X

DUANE A. REGER, *Primary Examiner.*

ARTHUR L. LA POINT, *Examiner.*